United States Patent
Myers et al.

(10) Patent No.: US 7,186,442 B2
(45) Date of Patent: Mar. 6, 2007

(54) CONSTRAINED LAYER DAMPER

(75) Inventors: Robert D. Myers, Commerce Township, MI (US); Philip E. Weber, Novi, MI (US); Kevin Casey, Shelby Township, MI (US); Cheong Kow, Troy, MI (US); Steven A. Rosenberg, Succasunna, NJ (US); Norman Blank, Ruschlikon (CH)

(73) Assignee: Sika Technology AG, Baar (CH)

( * ) Notice: Subject to any disclaimer, the term of this patent is extended or adjusted under 35 U.S.C. 154(b) by 24 days.

(21) Appl. No.: 10/458,889

(22) Filed: Jun. 11, 2003

(65) Prior Publication Data

US 2004/0253453 A1    Dec. 16, 2004

(51) Int. Cl.
| | |
|---|---|
| B05D 5/00 | (2006.01) |
| B05D 7/24 | (2006.01) |
| B05D 1/02 | (2006.01) |
| B05D 1/36 | (2006.01) |
| B05D 1/42 | (2006.01) |

(52) U.S. Cl. ............................ 427/407.1; 427/421.1; 427/424; 427/426

(58) Field of Classification Search ............ 427/407.1, 427/413, 417, 421, 424, 426; 181/207, 284, 181/290, 294
See application file for complete search history.

(56) References Cited

U.S. PATENT DOCUMENTS

| | | | | |
|---|---|---|---|---|
| 3,169,881 A | | 2/1965 | Bodine, Jr. | |
| 3,833,404 A | * | 9/1974 | Sperling et al. ............. | 428/413 |
| 3,842,942 A | * | 10/1974 | Jensen et al. ............... | 181/207 |
| 4,250,074 A | * | 2/1981 | Foscante et al. ............ | 523/428 |
| 4,346,782 A | | 8/1982 | Bohm | |
| 4,785,760 A | * | 11/1988 | Tholome .................... | 118/323 |
| 4,851,271 A | * | 7/1989 | Moore et al. ............... | 428/34.5 |
| 5,225,498 A | * | 7/1993 | Sorathia et al. ............. | 525/454 |
| 5,271,142 A | * | 12/1993 | Moore et al. ............... | 29/469.5 |
| 5,302,634 A | * | 4/1994 | Mushovic .................... | 523/219 |
| 5,656,210 A | * | 8/1997 | Hill et al. ..................... | 264/2.6 |
| 5,725,931 A | * | 3/1998 | Landin et al. ............... | 428/134 |
| 6,123,171 A | | 9/2000 | McNett et al. | |
| 2003/0208259 A1 | * | 11/2003 | Penhasi ...................... | 623/1.15 |

FOREIGN PATENT DOCUMENTS

| | | |
|---|---|---|
| DE | 1500898 A1 | 11/1970 |
| DE | 1201083 | 9/1982 |
| DE | 3932033 A1 | 5/1991 |
| EP | 1026366 A1 | 8/2000 |
| EP | 1207081 A2 | 5/2002 |
| GB | 2094948 A | 9/1982 |
| WO | WO-0052681 A1 | 9/2000 |
| WO | WO 01/10682 A1 | 2/2001 |
| WO | PCT/JP02/10086 A1 | 4/2003 |

OTHER PUBLICATIONS

Definition of "catalyst" from Hawley's Condensed Chemical Dictionary, 11th Edition, Copyright 1987 by Van Nostrand Reinhold, p. 231.*
Patent Abstract of Japan for Publication No. 024266643, Sep. 22, 1992, Nissan Motor Co Ltd.

* cited by examiner

Primary Examiner—William Phillip Fletcher
(74) Attorney, Agent, or Firm—Rader, Fishman & Grauer PLLC

(57) ABSTRACT

A method for installing a constrained layer damper on a product of manufacture is disclosed. The method includes applying a layer of first polymeric material to a substrate of the product, wherein the first polymeric material is viscoelastic when solidified. Then, a second layer of polymeric material, which is stiff when solidified, is applied to the first polymeric material such that said first polymeric material is constrained between the second polymeric material and the substrate of the product. At least one of the layers of polymeric materials is dispensed in fluid form during the manufacture of the product from a bulk source of fluid material. The polymeric materials are chosen such that they do not require the application of heat above room temperature to solidify.

39 Claims, 3 Drawing Sheets

CONSTRAINED LAYER DAMPER

BACKGROUND

The present invention generally relates to constrained layer dampers that are used to dissipate vibration energy.

Undesirable vibration energy occurs in a variety of products and devices. For example, in automotive vehicles, the engine and other automotive systems can cause vibration energy to permeate through the vehicle body and into the vehicle's passenger compartment. Similar undesirable vibration energy results in a variety of other situations, such as in household appliances and other types of transportation vehicles, to name a few.

To reduce undesirable vibration energy, it is known to adhere single-layer vibration-damping panels and apply single-layer vibration-damping materials to the surfaces of automobile panels, floors, and the like (and to appliances and other devices) to reduce vibration effects inside of the passenger compartment. Single-layer vibration-damping panels and coatings are relatively cost-effective, and they do reduce undesirable vibrations. It is also known to use constrained layer dampers to minimize undesirable vibrations in certain circumstances. Constrained layer dampers generally consist of a layer of polymeric damping material adhered to a surface of a panel of the product (e.g., automobile, appliance, etc.) and a stiff outer top layer that constrains the polymeric damping material, effectively "sandwiching" the polymeric damping material between the stiff outer top layer and the product panel (the "substrate"). It has been determined that constrained layer dampers are generally more effective at reducing undesirable vibration than single layer dampers. However, constrained layer dampers are generally more expensive to manufacture and install.

The inventors hereof have recognized the need for an improved constrained layer damper and for an improved modular method of installing constrained layer dampers in automated manufacturing settings.

DETAILED DESCRIPTION

Figure 1:
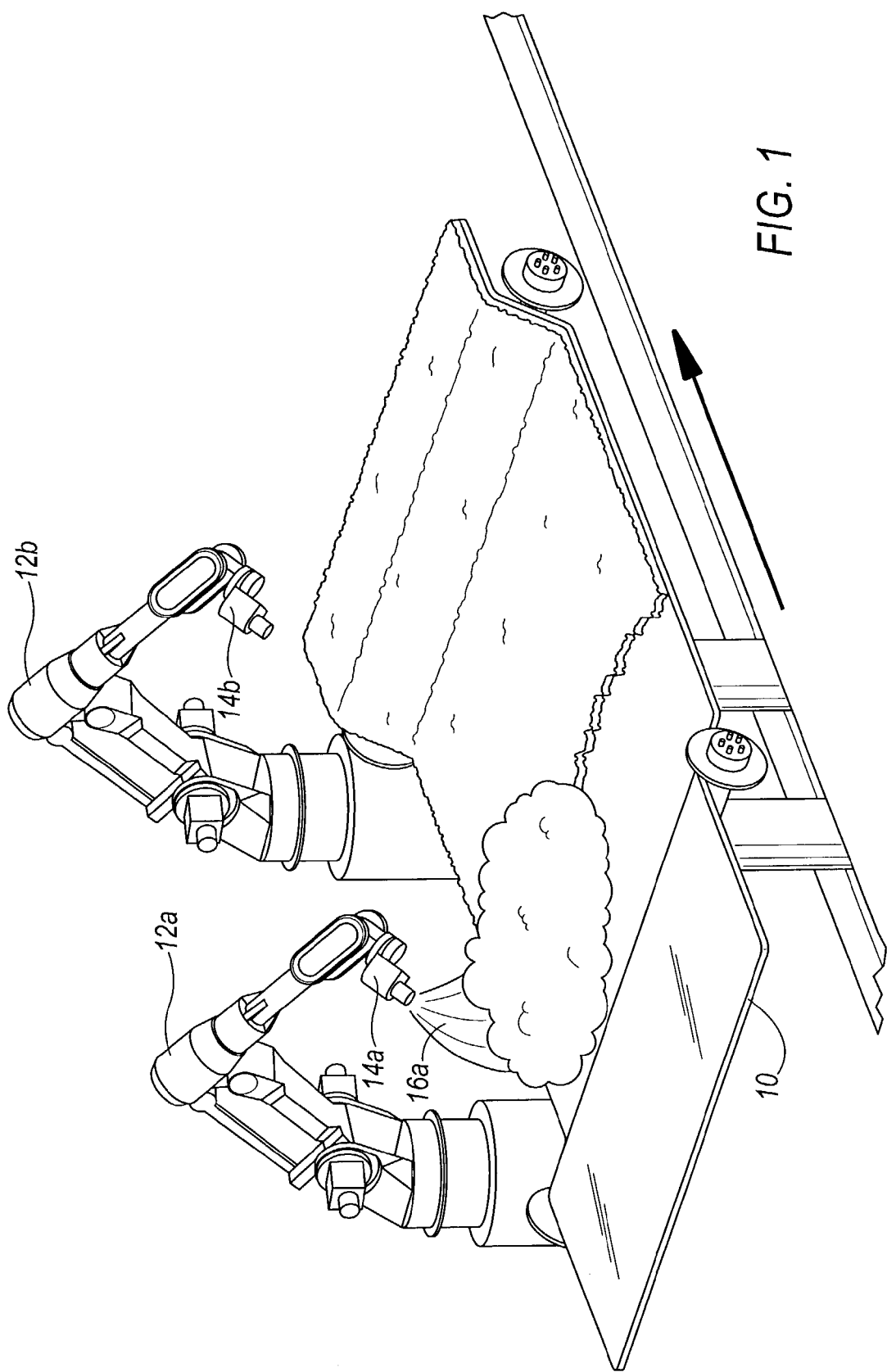
FIG. 1 illustrates an exemplary automated manufacturing setting, including a system for applying a constrained layer damper, showing the fluidic application of a first polymeric material.

An exemplary embodiment of an improved constrained layer damper and a method of applying a constrained layer damper in an automated manufacturing setting is hereinafter disclosed.

The improved constrained layer damper comprises at least two layers of materials. The "base" layer of material is a visco-elastic polymeric material, which is applied or adhered directly to a panel (substrate) of a product for which the vibration-reducing effect is desired. For example, in the case of an automotive vehicle, the first layer could be applied/adhered to a metal floor panel. The first layer of polymeric material is chosen so as to adhere well to the substrate in question. This material is designed to maximize damping performance defined by the material loss factor in the range of the intended operating temperatures. This loss factor is calculated from the phase angle by which the stress leads the strain in the deformable solid material. This loss factor will be a maximum over the glass transition region of the material, and may achieve values in excess of 1.0 in this region. The corresponding stiffness of the first layer will be low relative to the stiffness of the top or constraining layer, as described hereinafter. Examples of acceptable materials that can be used as the first layer in the improved constrained layer damper include, without limitation, acrylic polymers, synthetic resins, emulsions, and bituminous based materials. Examples of suitable materials would include polyurethanes, styrene block co-polymers, polyureas, silane terminated polyurethanes, modified silane polymers, polyisobutylenes, EPDM, natural rubber, epoxy resins and other polymer materials that can be modified to achieve the desired physical properties. More specific, commercially-available, materials that can be employed as the base layer in the constrained layer damper include: (1) Sikafloor Pronto 18, a two component peroxide-cured modified PMMA; (2) SikaTransfloor 352 VP, a two component polyurethane; (3) Sikafloor 325, a two component polyurethane; (4) PU Read, a two component polyurethane; and (5) FM 100, a styrene butadiene block copolymer, all of which are commercially available from the assignee hereof.

The improved constrained layer damper further includes an "outer" or "top" layer of material that is applied to the base visco-elastic polymeric material. The outer layer of material is also a polymeric material, but the outer polymeric material layer has a high degree of stiffness when in its solid state. The stiffness of the outer layer will generally be a factor of ten times higher in stiffness than the base layer, and will have Young's Modulus (E') in excess of $1.0 \times (10)^9$ MPa over the glassy region of the material. The outer layer of material is formulated to ensure that the glass transition region of the material and corresponding roll-off in modulus are above the operating temperature range in the application. This material may be homogeneous in nature or may incorporate reinforcing fibers or fillers to enhance stiffness. The outer layer of material may be applied as a single or multiple component system. Examples of acceptable materials that can be used as the second layer in the improved constrained layer damper include, without limitation, epoxy resins, polyureas, acrylic polymers, polyurethanes, epoxy polyurethane hybrids, polyesters, modified polyesters, and other polymers that can be modified to achieve the desired physical properties. More specific, commercially-available, materials that can be employed as the top layer in the constrained layer damper include: (1) Sikadur 32, a two component toughened epoxy; (2) Sikafloor 381, a two component chemically-resistant epoxy; and SikaGard 62, a two component epoxy.

The respective polymeric materials are chosen so that they adhere well to each other. Preferably, the respective polymeric materials are chosen such that they solidify without the application of heat. Specifically, it is preferable that the polymeric materials are chosen such that they solidify by cooling to room temperature, by drying, by chemical reaction at room temperature, or by other known means of solidifying or curing that do not require the application of heat above room temperature. In this way, the inventive constrained layer damper can be installed onto vehicles (and other manufactured products) in a more flexible way. That is, the two layers of the constrained layer damper can be applied after the vehicle (or other manufactured product) passes through the paint shop, which is normally the location on the assembly line where high temperatures are applied to the vehicle. If the constrained layer damper were to employ materials that required high temperatures to solidify, then the constrained layer damper would have to be applied to the vehicle (or other product) before it reached the paint shop. If the preferred polymeric materials are used—which do not require heat to solidify—then the constrained layer damper may be applied after the vehicle passes through the paint shop, which is sometimes desirable to maintain the integrity of the paint shop process. Furthermore, if the polymeric materials used for the constrained layer damper do not require heat to solidify, the different layers can be applied at different locations on the assembly line without regard to where the location(s) of application are relative to the paint shop.

In other embodiments of the invention, the improved constrained layer damper may include more than two layers of material, where the layers of material alternate between the visco-elastic polymeric material of the first layer and the stiff polymeric material of the second outer layer.

Figure 2:
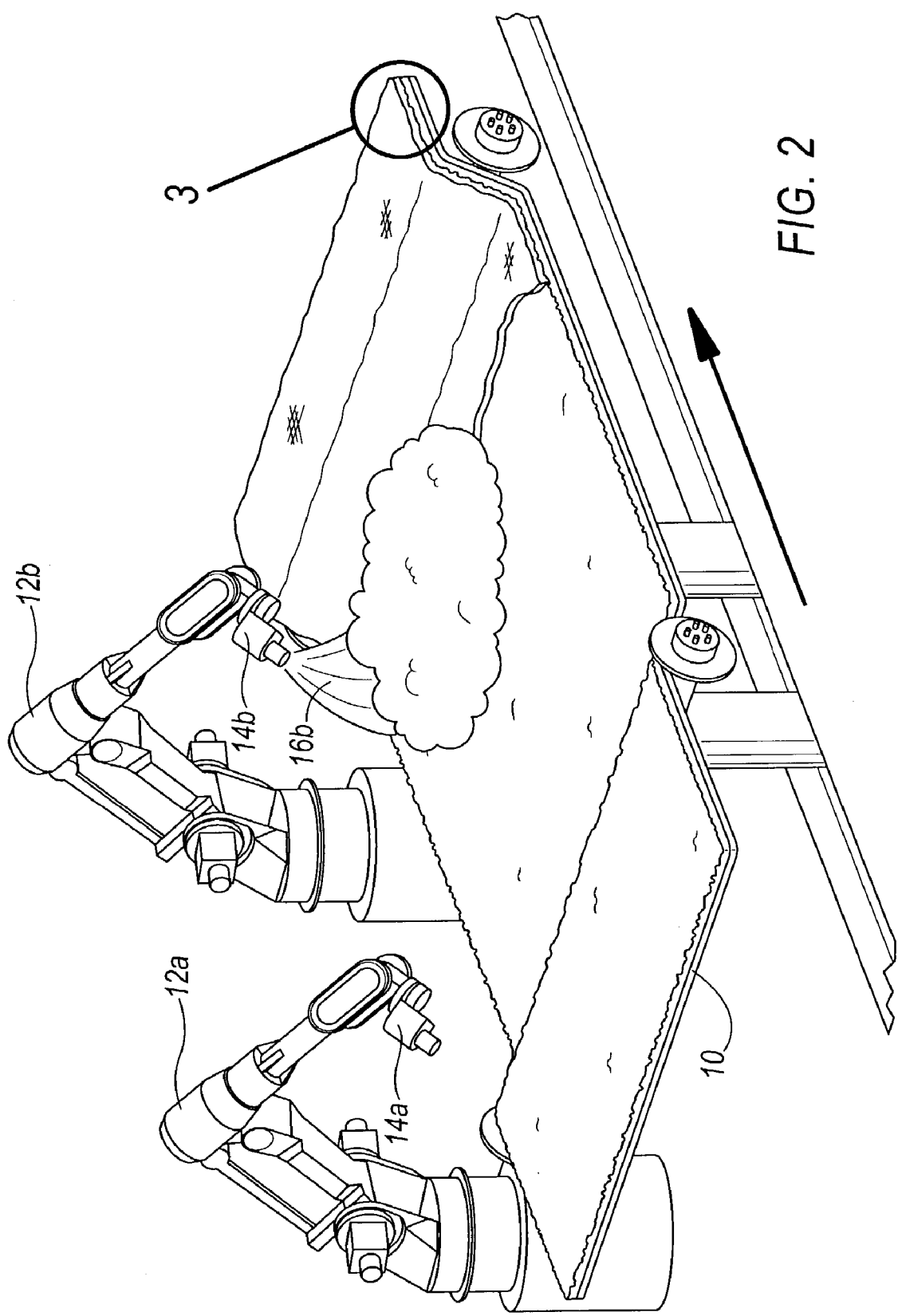
FIG. 2 illustrates an exemplary automated manufacturing setting, including a system for applying a constrained layer damper, showing the fluidic application of a second polymeric material.

The improved constrained layer damper is adapted to be applied dynamically during the manufacture of a product, such as an automotive vehicle, in an automated manufacturing setting. Referring to FIGS. 1 and 2, an exemplary automated manufacturing setting is illustrated, which, in this particular example, is a setting for automated manufacturing of automotive vehicles. FIGS. 1 and 2 illustrate a partially-manufactured automotive vehicle on an assembly line. At the illustrated point in the manufacturing process, the automotive vehicle still has an exposed floor panel 10 (substrate). It is desirable to include a vibration damper on floor panel 10 of the automotive vehicle. FIG. 1 illustrates a first articulated robot arm 12a, having an applicator head 14a with a nozzle for dispensing fluid materials. The exemplary automated manufacturing setting also includes a second articulated robot arm 12b, having an applicator head 14b with a nozzle for dispensing fluid material. The articulated robot arms 12a and 12b are electronically controlled by a control device (not shown), such as, for example, a computer workstation. The articulated robot arms 12a and 12b are controlled so that the robot arms are selectively positioned relative to the floor 10 of the automotive vehicle to dispense fluid material thereon.

The first applicator head 14a disposed on the articulated arm robot 12a is fluidly-connected to at least one source of fluid material (not shown). The second applicator head 14b disposed on the articulated arm robot 14b is also fluidly-connected to at least one source of fluid material (not shown), which is different from the fluid source connected to applicator head 14a. In some embodiments, the respective sources of fluid materials are drums or bulk containers of fluid materials. Various known metering and fluid delivery components and systems can be used to deliver desired amounts of the fluid materials from the respective sources to the corresponding applicator heads on the articulated robot arms.

Figure 3:
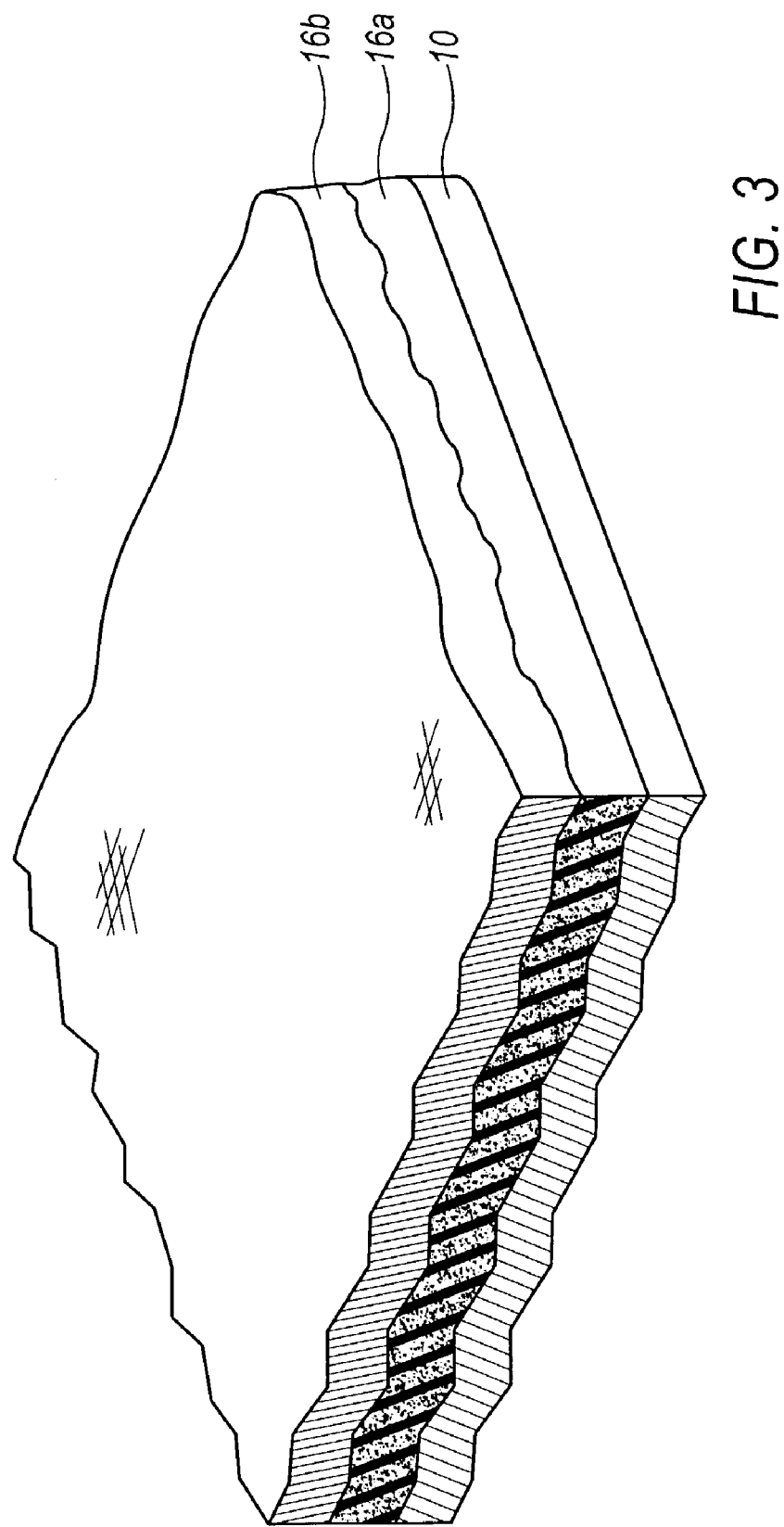
FIG. 3 is a cross-sectional view of the constrained layer damper, showing a substrate, a first layer of polymeric material, and a second layer of polymeric material.

The above-described system can be used to implement the improved constrained layer damper on the floor (or other substrate) of an automotive vehicle (or other manufactured product). For example, in one embodiment, a first layer of visco-elastic polymeric material 16a is dispensed, in fluid form, from the applicator head 14a of the robot arm 12a onto the substrate 10. The first layer of material is allowed to solidify and adhere to the substrate 10. Then, as shown in FIG. 2, the second layer of material 16b is dispensed, in fluid form, from the applicator head 14b of the robot arm 12b onto the first layer of visco-elastic polymeric material 16a. The second layer of material 16b is allowed to solidify into a stiff layer, which "sandwiches" the middle visco-elastic polymeric material 16a against the substrate 10, thereby creating the constrained layer damper. FIG. 3 illustrates a cross-section of the constrained layer damper, wherein a visco-elastic polymeric material 16a is "sandwiched" between the substrate 10 of the vehicle and a stiff polymeric material 16b.

As described above, if polymeric materials that do not require heat to solidify are chosen for the base and outer layers of the constrained layer damper, then the application of the base and outer layers may occur anywhere in the assembly/manufacturing process without regard to where in the process heat may be applied. For example, in the situation of an automotive vehicle, the layers of the constrained layer damper may be applied subsequent to the paint shop, which, in certain situations, is preferable to maintain the integrity of the paint process.

In another embodiment of the invention, each of the applicator heads 14a and 14b are configured to dispense a plurality of different versions of the two different layers of materials that comprise the constrained layer damper. For example, a variety of visco-elastic polymeric materials may be acceptable for use in the disclosed improved constrained layer damper, though certain visco-elastic polymeric materials may have better qualities than others. Many times, those materials that have superior qualities are more costly. Therefore, this embodiment includes a first applicator head 14a that can dispense, for example, a plurality of visco-elastic polymeric materials to be used as the first material layer in the constrained layer damper, applied to the substrate 10. Further, applicator head 14b may be configured to dispense one or more different stiff polymeric materials to be used as the outer layer in the constrained layer damper. In this way, the particular configuration of the constrained layer damper can be customized from one automotive vehicle to the next. For example, for Vehicle A, a first visco-elastic polymeric material can be dispensed from the applicator head onto the substrate and a first stiff polymeric material can then be dispensed onto the visco-elastic polymeric material to form the constrained layer damper. Then, for Vehicle B, which can be the next vehicle on the same assembly line, second visco-elastic polymeric material can be dispensed from the applicator head onto the substrate of vehicle B. Then, a second stiff polymeric material can be dispensed onto the second visco-elastic polymeric material to form the constrained layer damper. In this way, it is possible to customize the particular materials used to form the constrained layer damper from one vehicle to the next. For example, where a relatively inexpensive vehicle and a relatively expensive vehicle are assembled on the same automated assembly line, higher quality/cost materials can be used to form the constrained layer damper for the relatively expensive vehicle, and lower quality/cost materials can be used to form the constrained layer damper for the relatively inexpensive vehicle. A control device, such as a computer workstation could be used to control the application of the different materials for different vehicles.

In another embodiment of the invention, the functions of the two articulated robot arms 12a and 12b could be combined into a single articulated robot arm having one or more nozzles configured to dispense a first layer of visco-elastic polymeric material to a substrate 10, as well as one or more nozzles configured to dispense a second layer of stiff polymeric material onto the visco-elastic polymeric material. As in previous embodiments, the articulated robot arm, including the various dispensing nozzles thereon, would be electronically controlled by a controller device, such as a computer workstation.

In yet another embodiment, either the visco-elastic polymeric material or the stiff polymeric material can be applied in a solid piece form, and the other material can be dispensed from an articulated robot arm in fluid form. For example, a solid piece of visco-elastic polymeric material can be applied directly to the substrate of the automotive vehicle. The solid piece of visco-elastic polymeric material can be adhered to the substrate in a variety of known ways, such as by using heat, ultraviolet radiation, etc. Then, after the solid piece of visco-elastic polymeric material is adhered to the substrate, the outer layer of stiff polymeric material can be dispensed, in fluid form, from an applicator head on a robot arm over the visco-elastic polymeric material. The outer polymeric material is solidified, at which time it becomes stiff and, in combination with the substrate, "sandwiches" the middle visco-elastic polymeric material. As indicated above, additional alternating layers of the two polymeric materials can be added to the constrained layer damper. Alternatively, the first visco-elastic polymeric material can be dispensed onto the substrate of the automotive vehicle from the applicator head on the articulated robot arm, and the second stiff polymeric material can be applied over the visco-elastic polymeric material in a solid piece. More specifically, the first layer of visco-elastic polymeric material can be dispensed, in fluid form, from the applicator head of the robot arm to the substrate. The fluid material is solidified and adhered to the substrate. Then, a solid piece of stiff polymeric material can be adhered to the first layer of visco-elastic polymeric material. This solid piece of stiff polymeric material may be a dedicated constraining layer for the damping system, or this functionality may be incorporated into carpet backing, headliners, or other interior trim components added at a later stage in the assembly process. Similarly to above, additional alternating layers of the respective materials can be applied to create a multi-layer constrained layer damper.

In addition to the benefits described above, the application of the improved constrained layer damper in the manner described allows the constrained layer damper to be customized even further, depending on the particular vehicle (or product) upon which it is applied. For instance, the number of alternating layers can be customized, and the thickness of the visco-elastic polymeric material and the stiff polymeric material can be customized. Moreover, it is possible to apply single-layer dampers to some vehicles on the assembly line and to apply constrained layer dampers on other vehicles on the same assembly line.

Preferred embodiments have been disclosed. A person of ordinary skill in the art would realize, however, that certain modifications would come within the teachings of this Invention, and the following claims should be studied to determine the true scope and content of the invention. In addition, the methods and structures of representative embodiments can be incorporated in the form of a variety of embodiments, only a few of which are described herein. It will be apparent to the artisan that other embodiments exist that does not depart from the spirit of the invention. Thus, the described embodiments are illustrative and should not be construed as restrictive.

The invention claimed is:

1. A method for installing a constrained layer damper on a product of manufacture, comprising:

applying a layer of first polymeric material to a substrate of the product said first polymeric material being visco-elastic when solidified;

applying a layer of second polymeric material to said first polymeric material such that said first polymeric material is constrained between said second polymeric material and the substrate of the product, said second polymeric material being stiff when solidified;

wherein both said first polymeric material and said second polymeric material are dispensed in fluid form during the manufacture of the product from a bulk source of fluid material; and wherein at least one of said first and said second polymeric materials dispensed in fluid form solidifies at room temperature without the addition of an external, non-chemical catalyst.

2. The method of claim 1, wherein at least one of said first polymeric material and said second polymeric material is dispensed from an applicator head disposed on an articulated robot arm.

3. The method of claim 1, wherein said first polymeric material and said second polymeric material are dispensed from separate sources of fluid material.

4. The method of claim 3, wherein said first polymeric material is dispensed from a first applicator head disposed on a first articulated robot arm; and said second polymeric material is dispensed from a second applicator head disposed on a second articulated robot arm.

5. The method of claim 3, wherein said first polymeric material and said second polymeric material are both dispensed from a common applicator head disposed on an articulated robot arm.

6. The method of claim 3, wherein said applying a layer of first polymeric material to a substrate of the product comprises applying a first version of the first polymeric material when the product is a first product and applying a second version of the first polymeric material when the product is a second product, and said first version and said second version of said first polymeric material have relatively different vibration damping characteristics.

7. The method of claim 3, wherein said substrate is a panel member of an automotive vehicle.

8. The method of claim 1, wherein said applying a layer of first polymeric material to a substrate of the product comprises applying a first version of the first polymeric material when the product is a first product and applying a second version of the first polymeric material when the product is a second product, and said first version and said second version of said first polymeric material have relatively different vibration damping characteristics.

9. The method of claim 1, further comprising:

applying a first thickness of at least one selected from said fluidic first polymeric material and said fluidic second polymeric material when the substrate forms part of a first product of manufacture; and applying a second thickness of the at least one selected from said fluidic first polymeric material and said fluidic second polymeric material when the substrate forms part of a second product of manufacture.

10. The method of claim 1, wherein said substrate is a panel member of an automotive vehicle.

11. The method of claim 1, wherein said first layer material is a synthetic resin.

12. The method of claim 1, wherein said first layer material is an emulsion.

13. The method of claim 1, wherein said first layer material is a bituminous based material.

14. The method of claim 1, wherein said first layer material is polyurethane.

15. The method of claim 1, wherein said first layer material is a styrene block co-polymer.

16. The method of claim 1, wherein said first layer material is a polyurea.

17. The method of claim 1, wherein said first layer material is a silane terminated polyurethane.

18. The method of claim 1, wherein said first layer material is a silane polymer.

19. The method of claim 1, wherein said first layer material is a polyisobutylene.

20. The method of claim 1, wherein said first layer material is an EFDM.

21. The method of claim 1, wherein said first layer material is natural rubber.

22. The method of claim 1, wherein said first layer material is an epoxy resin.

23. The method of claim 1, wherein said second layer material is an epoxy resin.

24. The method of claim 1, wherein said second layer material is a polypropylene.

25. The method of claim 1, wherein said second layer material is a polyurea.

26. The method of claim 1, wherein said second layer material is an acrylic polymer.

27. The method of claim 1, wherein said second layer material is polyurethane.

28. The method of claim 1, wherein said second layer material is an epoxy polyurethane hybrid.

29. The method of claim 1, wherein said second layer material is polyester.

30. The method of claim 1, wherein said second layer material is a polyester.

31. A method of applying a vibration damper to products of manufacture on an assembly line, comprising:
   dispensing a layer of first polymeric material, in fluid form, onto a substrate of each product from an applicator head of an articulated robot arm, said first polymeric material being visco-elastic when solidified;
   selectively dispensing a layer of a second polymeric material, in fluid form, onto said first polymeric material for some of the products, said second polymeric material being stiff when solidified; and
   solidifying said first and second polymeric materials at room temperature without the addition of an external, non-chemical catalyst.

32. The method of claim 31, wherein said first polymeric material and said second polymeric material solidify without application of beat above room temperature.

33. A method of applying a vibration damper to products of manufacture on an assembly line, comprising:
   dispensing a layer of first polymeric material, in fluid font, onto a substrate of each product from an applicator head of an articulated robot arm, said first polymeric material being visco-elastic when solidified;
   dispensing a layer of a second polymeric material, in fluid form, onto said first polymeric material for each product, said second polymeric material being stiff when solidified; and
   adjusting a thickness of at least one of said dispensed layers;
   wherein at least one of said first and said second polymeric materials dispensed in fluid form
   solidifies at room temperature without the addition of an external, non-chemical catalyst.

34. A method for installing a contained layer damper on a product of manufacture, comprising;
   applying a layer of first polymeric material to a substrate of the product said first polymeric material being visco-elastic;
   applying a layer of second polymeric material to said first polymeric material such that said first polymeric material is constrained between said second polymeric material and the substrate of the product, said second polymeric material being stiff when solidified;
   wherein at least one of said first polymeric material and said second polymeric material is dispensed in fluid form during the manufacture of the product from a bulk source of fluid material; and
   wherein said first and second polymeric materials solidify without the application of heat above room temperature, and the first polymeric material is selected from the group consisting of a bituminous based material, a silane terminated polyurethane, a polyurea, and an epoxy polyurethane hybrid.

35. The method of claim 34, wherein the first polymeric material is a bituminous based material.

36. The method of claim 34, wherein the first polymeric material is a silane terminated polyurethane.

37. The method of claim 34, wherein the first polymeric material is a polyurea.

38. The method of claim 34, wherein the first polymeric material is an epoxy polyurethane hybrid.

39. A method for installing a constrained layer damper on a product of manufacture, comprising:
   applying a layer of first polymeric material to a substrate of the product said first polymeric material being visco-elastic when solidified;
   applying a layer of second polymeric material to said first polymeric material such that said first polymeric material is constrained between said second polymeric material and the substrate of the product, said second polymeric material being stiff when solidified;
   wherein both said first polymeric material and said second polymeric material are dispensed in fluid form during the manufacture of the product from a bulk source of fluid material; and
   wherein both said first and said second polymeric materials dispensed in fluid form solidify at room temperature without the addition of an external, non-chemical catalyst.

* * * * *

UNITED STATES PATENT AND TRADEMARK OFFICE
CERTIFICATE OF CORRECTION

| | |
|---|---|
| PATENT NO. | : 7,186,442 B2 |
| APPLICATION NO. | : 10/458889 |
| DATED | : March 6, 2007 |
| INVENTOR(S) | : Robert D. Myers et al. |

It is certified that error appears in the above-identified patent and that said Letters Patent is hereby corrected as shown below:

Col. 7, in Claim 20, line 14, "EFDM" should be --EPDM--.

Col. 8, in Claim 34, line 7, "contained" should be --constrained--.

Signed and Sealed this

First Day of May, 2007

JON W. DUDAS
*Director of the United States Patent and Trademark Office*